United States Patent
Rezvani et al.

(10) Patent No.: US 6,873,653 B1
(45) Date of Patent: Mar. 29, 2005

(54) METHOD AND APPARATUS FOR PRE-DISTORTION OF AN X-DSL LINE DRIVER

(75) Inventors: Behrooz Rezvani, Pleasanton, CA (US); Sam Heidari, Fremont, CA (US); John Zhongxuan Zhang, Fremont, CA (US); Dale Smith, Fremont, CA (US)

(73) Assignee: Ikanos Communication, Inc., Fremont, CA (US)

(*) Notice: Subject to any disclaimer, the term of this patent is extended or adjusted under 35 U.S.C. 154(b) by 580 days.

(21) Appl. No.: 09/779,256

(22) Filed: Feb. 7, 2001

Related U.S. Application Data (63) Continuation of application No. 09/740,620, filed on Dec. 18, 2000.
(60) Provisional application No. 60/172,404, filed on Dec. 17, 1999.

(51) Int. Cl.[7] ................................................ H04L 5/16
(52) U.S. Cl. ...................................... 375/222; 375/219
(58) Field of Search ................................ 375/219, 296, 375/285, 220, 221, 222, 223; 379/22.02, 27.01, 28, 31, 93.26, 418

(56) References Cited

U.S. PATENT DOCUMENTS

| | | | | |
|---|---|---|---|---|
| 5,049,832 A | | 9/1991 | Cavers | |
| 5,872,814 A | * | 2/1999 | McMeekin | 375/296 |
| 6,035,000 A | * | 3/2000 | Bingham | 375/296 |
| 6,055,268 A | * | 4/2000 | Timm et al. | 375/229 |
| 6,072,364 A | | 6/2000 | Jeckeln et al. | |
| 6,345,071 B1 | * | 2/2002 | Hamdi | 375/222 |
| 6,654,426 B2 | * | 11/2003 | Lagerblom et al. | 375/296 |

* cited by examiner

*Primary Examiner*—Young T. Tse
*Assistant Examiner*—Sam K. Ahn
(74) *Attorney, Agent, or Firm*—IP Creators; Charles C Cary (57) ABSTRACT

An apparatus and method is provided for minimizing in channel distortion in an X-DSL line driver is disclosed. The apparatus may be incorporated in an existing X-DSL architecture without additional circuitry. Out of band monitoring of a channel is implemented to adaptively minimize out of band interference and in band distortion. A unique training sequence, suitable for DMT line codes is set forth. The training sequence allows a full spectral characterization of the downstream signal space with a single upstream monitoring tone. The invention may be used with multi-channel X-DSL line drivers interfacing with any of a number of multi-channel supply architectures. The apparatus may be applied with equal advantage to communication protocols other than X-DSL. The apparatus may be applied with equal advantage in wired and wireless media.

21 Claims, 7 Drawing Sheets

Setup Phase

FIG. 3A  Setup Phase

FIG. 3B  Configuration Phase

FIG. 3C Operational Phase

METHOD AND APPARATUS FOR PRE-DISTORTION OF AN X-DSL LINE DRIVER

CROSS REFERENCE TO RELATED APPLICATION

This application is a continuation of copending U.S. application Ser. No. 09/740,620 filed Dec. 18, 2000 entitled "Method and Apparatus for Predistortion of an X-DSL Line Driver" which claims the benefit of prior filed Provisional Applications No. 60/172,404 filed on Dec. 17, 1999 entitled "Pre-Distortion System for ADSL and G.Lite Transmission". Each of the above-cited applications is incorporated herein by reference in its entirety.

BACKGROUND OF THE INVENTION

1. Field of Invention

The field of the present invention relates in general to an adaptive pre-distortion systems and more particularly to a method and apparatus for adaptive pre-distortion in particular but not exclusively of X-DSL line drivers.

2. Description of the Related Art

North American Integrated Service Digital Network (ISDN) Standard, defined by the American National Standard Institute (ANSI), regulates the protocol of information transmissions over telephone lines. In particular, the ISDN standard regulates the rate at which information can be transmitted and in what format. ISDN allows full duplex digital transmission of two 64 kilo bit per second data channels. These data rates may easily be achieved over the trunk lines, which connect the telephone companies' central offices. The problem lies in passing these signals across the subscriber line between the central office and the business or residential user. These lines were originally constructed to handle voice traffic in the narrow band between 300 Hz to 3000 Hz at bandwidths equivalent to several kilo baud.

Digital Subscriber Lines (DSL) technology and improvements thereon including: G.Lite, ADSL, VDSL, HDSL all of which are broadly identified as X-DSL have been developed to increase the effective bandwidth of existing subscriber line connections, without requiring the installation of new fiber optic cable. An X-DSL modem operates at frequencies higher than the voice band frequencies, thus an X-DSL modem any operate simultaneously with a voice band modem or a telephone conversation. Currently there are over ten discrete X-DSL standards, including: G.Lite, ADSL, VDSL, SDSL, MDSL, RADSL, HDSL, etc.

One of the factors limiting the bandwidth or channel capacity of any of the above discussed X-DSL protocols is interchannel interference. Electronic amplifiers and line drivers employed in many communication systems inherently distort signals as they amplify them. Furthermore, to maximize power efficiency these line drivers are often operated near the saturation point where the input/output power characteristics become nonlinear. Amplitude modulation causes distortion to become dependent on the input signal with a result of the amplified output signal is no longer simply an amplified replica of the input signal. Unfortunately if linear modulation with a fluctuating envelope is used in conjunction with nonlinear amplification, spectral spreading into adjacent cans will occur thereby interfering with communications.

What is needed are approaches to reducing in band distortion and out-of band interference for X-DSL line drivers.

SUMMARY OF THE INVENTION

An apparatus and method is disclosed for minimizing in channel distortion in an X-DSL line driver. The apparatus may be incorporated in an existing X-DSL architecture without additional circuitry. Out of band monitoring of a channel is implemented to adaptively minimize out of band interference and in band distortion. A unique training sequence, suitable for DMT line codes is set forth. The training sequence allows a full spectral characterization of the downstream signal space with a single upstream monitoring tone.

During a setup phase one or more device parameters are varied for each of a plurality of tones to characterize the out of band leakage of the transmit line. At the close of the setup phase device parameters are selected which result in the lowest overall out-of-band interference on the upstream signal line.

Next, during a configuration phase the same training sequence is implemented at varying amplitudes across the downstream signal space. Using a leakage model of the out-of-band interference and an initial device model the expected out-of-band interference is calculated for each tone in the training sequence. The error between the calculated value of the out-of-band interference and the received monitor tone is determined and the initial device model is updated to reflect actual operating conditions.

At the completion of the configuration phase an inverse channel model is generated using the values accumulated in the updated device model table. This inverse model is used to distort each transmitted symbol sequence to linearize the line driver and other portions of the transmit circuit during actual operation.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

An apparatus and method is provided for minimizing in channel distortion in an X-DSL line driver is disclosed. The apparatus may be incorporated in an existing X-DSL architecture without additional circuitry. Out of band monitoring of a channel is implemented to adaptively minimize out of band interference and in band distortion. A unique training sequence, suitable for DMT line codes is set forth. The training sequence allows a full spectral characterization of the downstream signal space with a single upstream monitoring tone. The invention may be used with multi-channel X-DSL line drivers interfacing with any of a number of multi-channel supply architectures. The apparatus may be applied with equal advantage to communication protocols other than X-DSL. The apparatus may be applied with equal advantage in wired and wireless media.

Figure 1:
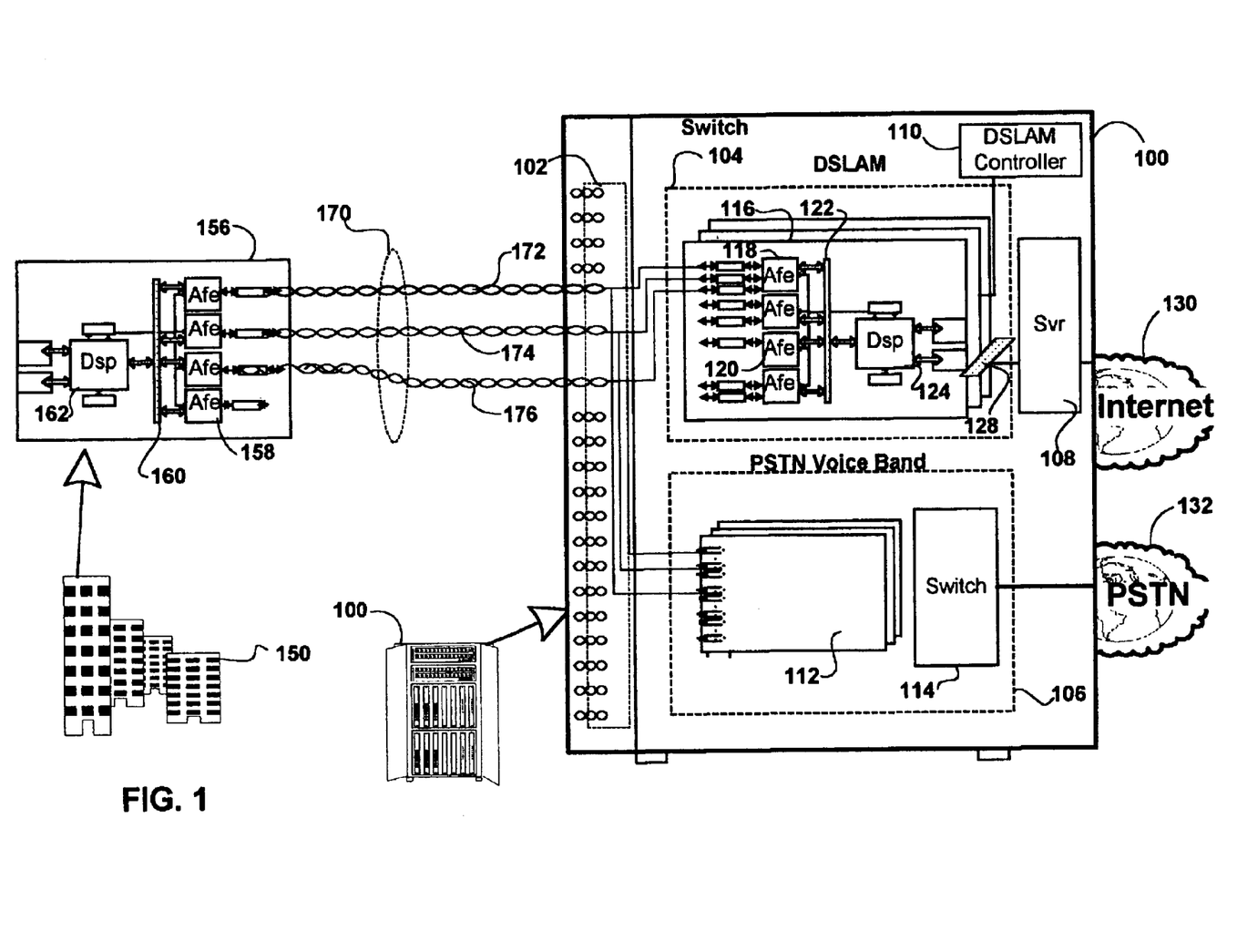
FIG. 1 shows a communication system with a pair of multi-mode multi-channel modem line cards coupled to one another by a binder of subscriber lines between a public switched telephone network (PSTN) central office (CO) and a remote site.

FIG. 1 shows a communication system with a pair of multi-mode multi-channel modem line cards coupled to one another by a binder of subscriber lines between a public switched telephone network (PSTN) central office (CO) and a remote site. The system includes a CO 100 and a remote line card 156 positioned at a remote terminal 150. The CO and remote line card are coupled to one another via a subscriber line binder 170 which includes individual subscriber lines 172,174, 176.

Each of the subscriber line connections terminates on the CO end, in the frame room 102 of the CO. From this room connections are made for each subscriber line via splitters and hybrids to both a DSLAM 104 and to the voice band racks 106. The splitter shunts voice band communications to dedicated line cards, e.g. line card 112 or to a voice band modem pool (not shown). The splitter shunts higher frequency X-DSL communications on the subscriber line to a selected fine card, e.g. line card 116, within DSLAM 104. The line cards of the current invention are universal, meaning they can handle any current or evolving standard of X-DSL and may be upgraded on the fly to handle new standards.

Voice band call set up is controlled by a Telco switch matrix 114 such as SS7. This makes point-to-point connections to other subscribers for voice band communications across the public switched telephone network 132. The X-DSL communications may be processed by a universal line card such as line card 116. That line card includes a plurality of AFE's 118–120 each capable of supporting a plurality of subscriber Lines. The AFEs are coupled via a packet based bus 122 to the DSP 124. For downstream communications from the CO to the remote site, the DSP modulates the data for each communication channel, the AFE transforms the digital symbol packets assembled by the DSP and converts them to an analog signal which is output on the subscriber line associated with the respective channel. For upstream communications from the remote site to the CO each received channel is converted within the corresponding AFE to a digitized data sample which is sent to the DSP for demodulation. The DSP is capable of multi-protocol support for all subscriber lines to which the AFE's are coupled. Communications between AFE's and DSP(s) may be packet based, in which embodiment of the invention a distributed architecture such as will be set forth in the following FIG. 2 may be implemented. The line card 116 is coupled to a back-plane bus 128 which may be capable of offloading and transporting low latency X-DSL traffic between other DSPs for load balancing. The back-plane bus of the DSLAM also couples each line card to the Internet 130 via server 108. Each of the DSLAM line cards operates under the control of a DSLAM controller 110 which handles global provisioning, e.g. allocation of subscriber lines to AFE and DSP resources. The various components on the line card form a plurality of logical modems each handling upstream and downstream communications across corresponding subscriber lines. In an alternate embodiment of the invention discrete modems would each couple to an associated one of the subscriber lines rather than the logical modem shown. When an X-DSL communication is established on a subscriber line, a specific channel identifier is allocated to that communication. That identifier is used in the above mentioned packet based embodiment to track each packet as it moves in an upstream or downstream direction between the AFE and DSP.

At the remote site a similar line card architecture is shown for lie card 156 which forms a plurality of logical modems connected to corresponding ones of subscriber lines 172, 174, 176. That line card includes AFEs 158, a packet bus 160 and a DSP. In an alternate embodiment of the invention the termination at the remote site 150 would be a set of discrete modems each coupled to an associated one of the subscriber lines rather than the logical modem shown. These modules, AFE and DSP, may be found on a single universal line card, such as line card 116 in FIG. 2. They may alternately be displaced from one another on separate line cards linked by a DSP bus. In still another embodiment they may be found displaced from one another across an ATM network. There may be multiple DSP chipsets on a line card. In an embodiment of the invention the DSP and AFE chipsets may include structures set forth in the figure for handling of multiple line codes and multiple channels.

Figure 2:
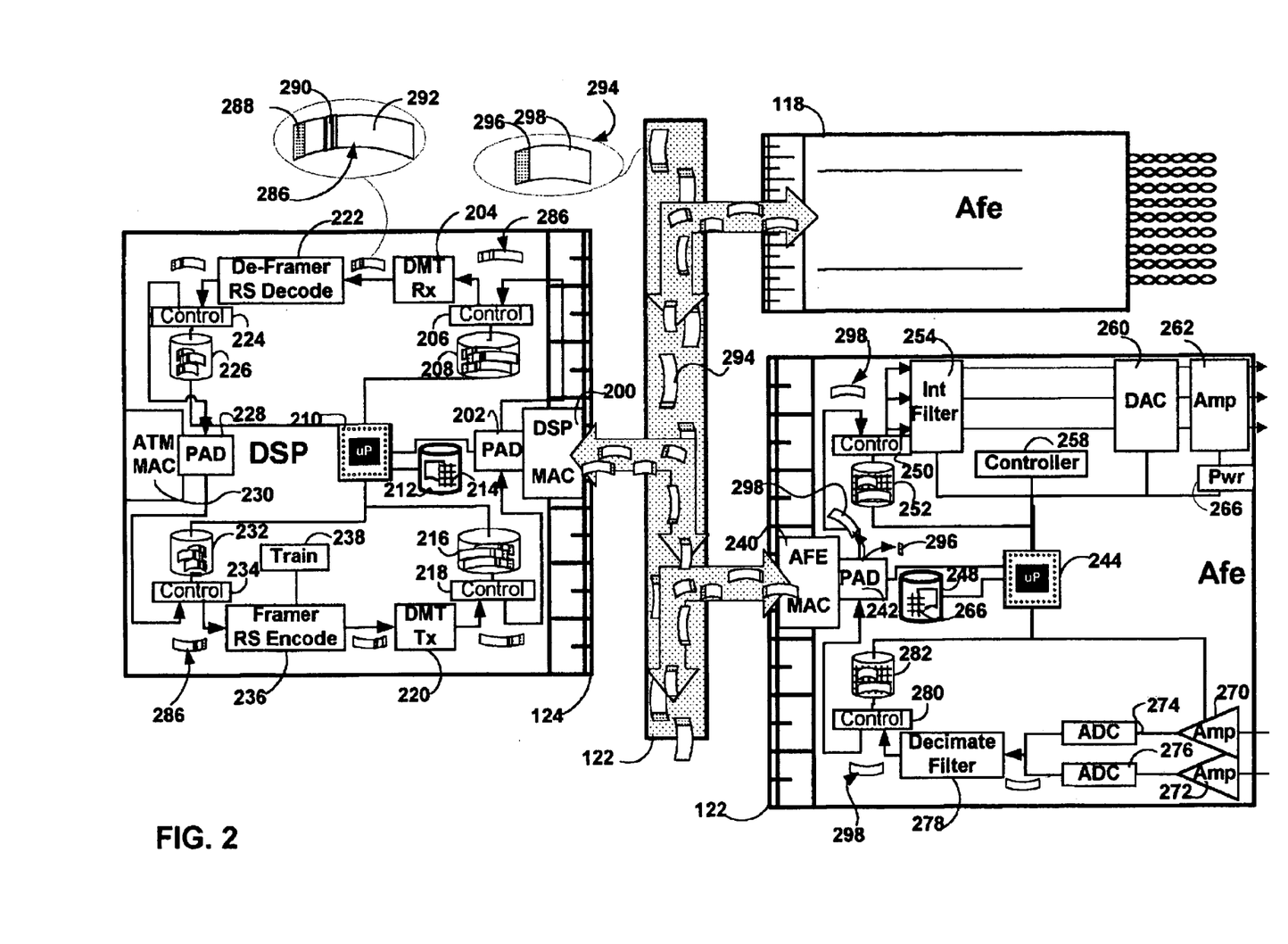
FIG. 2 is a detailed hardware block diagram of one of the modem line cards shown in FIG. 1.

FIG. 2 is a detailed hardware block are hardware block diagram of one of the modem line cards shown in FIG. 1. FIG. 2 shows a packet based multi-channel transmission architecture within which the current invention may be implemented. In this architecture a DSP 124 handles processing for a number of channels of upstream and downstream subscriber line communications via a number of AFE's. Each AFE in turn accepts packets associated with a plurality of subscriber lines to which each AFE is coupled. FIG. 2 shows a packet based raw data processing both between a DSP and AFE as well as within each DSP and AFE. Packet processing between DSP and AFE modules involves transfer of bus packets 294 each with a header portion 296 and data portion 298. The header contains information correlating the data with a specific channel and direction, e.g. upstream or downstream, of communication. The data portion contains for upstream traffic digitized samples of the received data for each channel and for downstream packets digitized symbols for the data to be transmitted on each channel. Packet processing within a DSP may involve device packets 286. The device packets may include a header 288, a control portion 290 and a data portion 292. The header serves to identify the specific channel and direction. The header my contain control information for the channel to be processed. The control portion 290 may so contain control portions for each specific component along the transmit or receive path to coordinate the processing of the packets. Within the AFE the digitized data generated for the received (upstream data) will be packetized and transmitted to the DSP. For downstream data, the AFE will receive in each packet from the DSP the digitized symbols for each channel which will be modulated in the AFE and transmitted over the corresponding subscriber line.

These modules, AFE and DSP, may be found on a single universal line card, such as line card 116 in FIG. 1. They may alternately be displaced from one another on separate lie cards linked by a DSP bus. In still another embodiment they may be found displaced across an ATM network.

DSP line card 116 includes one or more DSP's. In an embodiment of the invention each may include structures set forth in the figure for handling of multiple line codes and multiple channels. The line card includes, a DSP medium access control (MAC) 200 which handles packet transfers to and from the DSP bus 122. The MAC couples with a packet assembler/disassembler (PAD) 202. For received DSP bus packets, the PAD handles removal of the DSP bus packet header 296 and insertion of the device header 288 and control header 290 which is part of the device packet 286. The content of these headers is generated by the core processor 212 using statistics gathered by the de-framer 222. These statistics may include gain tables, or embedded operations channel communications from the subscriber side. The PAD embeds the required commands generated by the core processor in the header or control portions of the device packet header. Upstream device packets (Receive packets) pass into a first-in-first-out FIFO buffer 208 which is controlled by FIFO controller 206. These packets correspond with multiple protocols and multiple channels. Each is labeled accordingly. The receive processing engine 204 in this case a DMT engine fetches packets and processes the data in them in a manner appropriate for the protocol, channel and command instructions, if any, indicated by the header. The processed data is then passed to the De-Framer and Reed Solomon Decoder 222. This module reads the next device packet and processes the data in it in accordance with the instructions or parameters in its header. The processed de-framed data is passed to the final FIFO buffer 226 which is controlled by controller 204. That data is then passed to the ATM pad 228 for wrapping with an ATM header and removal of the device header. The ATM MAC 230 then places the data with an ATM packet on the ATM network 130 (see FIG. 1).

Control of the receive modules, e.g. DMT engine 204 and de-framer decoder 222 as well as sub modules thereof is implemented as follows. The core processor 210 has DMA access to the FIFO buffer 226 from which it gathers statistical information on each channel including gain tables, or gain table change requests from the subscriber as well as instructions in the embedded operations portion of the channel. Those tables 214 are stored by the core processor in memory 212. When a change in gain table for a particular channel is called for the core processor sends instructions regarding the change in the header of the device packet for that channel via PAD 202 and writes the new gain table to a memory which can be accessed by the appropriate module, i.e. DMT module 204 or the appropriate sub module thereof as a packet corresponding to that channel is received by the module. This technique of in band signaling with packet headers allows independent scheduling of actions on a channel by channel basis in a manner which does not require the direct control of the core processor. Instead each nodule in the transmit path can execute independently of the other at the appropriate time whatever actions are required of it as dictated by the information in the device header which it reads and executes.

This device architecture allows the DSP transmit and receive paths to be fabricated as independent modules or sub modules which respond to packet header control information for processing of successive packets with different X-DSL protocols, e.g. a packet with ADSL sample data followed by a packet with VDSL sampled data. Within the DMT Rx engine 204 for example, there may be sub modules with independent processing capability such as: a time domain equalizer, a cyclic prefix remover, a DFT, a gain scalar, a trellis decoder and a tone reorderer, as well as filters, a windowers . . . etc. Each of these sub modules has its counterpart on the DMT Tx engine 220 in the transmit path. Each of these may independently respond to successive device headers to change parameters between successive packets. For example as successive packets from channels implementing G.Lite, ADSL and VDSL pass through the DMT Tx engine the number of tones will vary from 128 for G.lite, to 256 for ADSL, to 2048 for VDSL. The framer and de-framer will use protocol specific information associated with each of these channels to look for different frame and super frame boundaries. The DMT receive engine 204 implements processes for monitoring a monitor tone on the upstream channel during the setup and configuration phases of the method for adaptively minimizing out of band interference and in band distortion. The measured level of each tone is maintained by processor 210 in memory 212. This same memory nay be utilized for calculating the inverse channel model for each of the channels to determine the amount of pre-distortion to be applied to downstream data on each of the channels.

On the downstream side, i.e. Transmit, the same architecture applies. ATM data which is unwrapped by PAD 228 is re-wrapped with a device header the contents of which are again dictated by the core processor 210. That processor embeds control information related to each channel in the packets corresponding to that channel. The device packets are then passed to the FIFO buffer 232 which is controlled by controller 234. The Framer and RS encoder 236 and or sub modules thereof then processes these packets according to the information contained in their header or control portions of each device packet. The Framer then updates the device packet header and writes the resultant device packet to the DMT transmit module 220. This module accepts the data and processes it for transmission. Transmission processing may include: tone ordering, trellis encoding, gain scaling, an IDFT, and cyclic prefix modules each with independent ability to read and respond to device headers. During the training and setup phases the training module 238 generates a unique set of tones across the downstream signal space which results in out-of-band interference on a single tone of the upstream channel. (See FIGS. 3–5). During the operational phase an inverse channel model maintained in memory 212 is utilized to pre-distort each downstream channel to linearize the in band signal and to minimize out of band interference with the upstream channel. Separate inverse channel models are maintained for each channel.

From the DMT Tx engine 220 each updated device packet with a digitized symbol(s) for a corresponding channel is placed in the FIFO buffer 216 under the control of controller 218. From this buffer the device packet is sent to PAD 202 where the device header is removed. The DSP PAD places the DSP packet 294 with an appropriate header onto the DSP bus 122 for transmission to the appropriate AFE and the appropriate channel and subscriber line within the AFE.

Because the data flow in the AFE allows a more linear treatment of each channel of information an out of band control process is utilized within the AFE. In contrast to the DSP device packets which are used to coordinate various independent modules within the DSP the AFE accomplishes channel and protocol changeovers with a slightly different control method.

A packet on the bus 294 directed to AFE 122 is detected by AFE MAC 240 on the basis of information contained in the packet header. The packet is passed to PAD 242 which removes the header 296 and sends it to the core processor 244. The packet's header information including channel ID is stored in the core processor's memory 248. The information is contained in a table 266. The raw data 298 is passed to a FIFO buffer 252 under the control of controller 250. Each channel has a memory mapped location in that buffer.

On the transmit path, the interpolator 254 reads a fixed amount of data from each channel location in the FIFO buffer. The amount of data read varies for each channel depending on the bandwidth of the channel. The amount of data read during each bus interval is governed by entries in the control table for each channel which is established during channel setup and is stored in memory 248. The interpolator up samples the data and low pass filters it to reduce the noise introduced by the DSP. Implementing interpolation in the AFE as opposed to the DSP has the advantage of lowering the bandwidth requirements of the DSP bus 310A. From the interpolator data is passed to the digital-to-analog converter (DAC) 260. The DAC converts the digitized symbol for each of the input signals on each of the input signal lines/channels to corresponding analog signals. These analog signals are introduced to the amplification stage 262, from which they are coupled to corresponding subscriber lines. The amplification stage is coupled to a power supply 266. Each of the transmit modules 254, 260, 262 is coupled to the control processor 244. During the setup phase the controller 258 varies one or more input parameters, e.g. voltage, current, etc. of one or more of the transmit modules as each tone is generated on the downstream transmission path of the DSP. The sequence is synchronized using the packet headers associated with each channel and a control sequence which may be downloaded from the DSP to the AFE prior to the setup phase for each channel.

The parameters for each of the modules 254, 260, 262, i.e. filter coefficients, amplifier gain etc. are controlled by the core processor using control parameters stored during session set up. For example, where successive packets carry packets with G.Lite, ADSL, and VDSL protocols the sample rate of the filter parameters for filter 254 and the gain of the analog amplifiers within stage 262 will vary for each packet. This "on the fly" configurability allows a single transmit or receive pipeline to be used for multiple concurrent protocols.

On the upstream path, the receive path, individual subscriber lines couple to individual line amplifiers, e.g. 270–272, through splitter and hybrids (not shown). Each channel is passed to dedicated ADC modules 274–276. Next each channel may be subject to further filtering and decimation 278. As discussed above in connection with the transmit path, each of these components is configured on the fly for each new packet depending on the protocol associated with it. Each channel of data is then placed in a memory mapped location of FIFO memory 282 under the control of controller 280. Scheduled amounts of this data are moved to PAD 242 during each bus interval. The PAD wraps the raw data in a DSP header with channel ID and other information which allows the receiving DSP to properly process it.

In an alternate embodiment of the invention the sane packet based control principal may be used in both the transmit and receive path to implement not only multiple protocols concurrently but alternate lines codes, e.g. CAP/QAM.

Figure 3A:
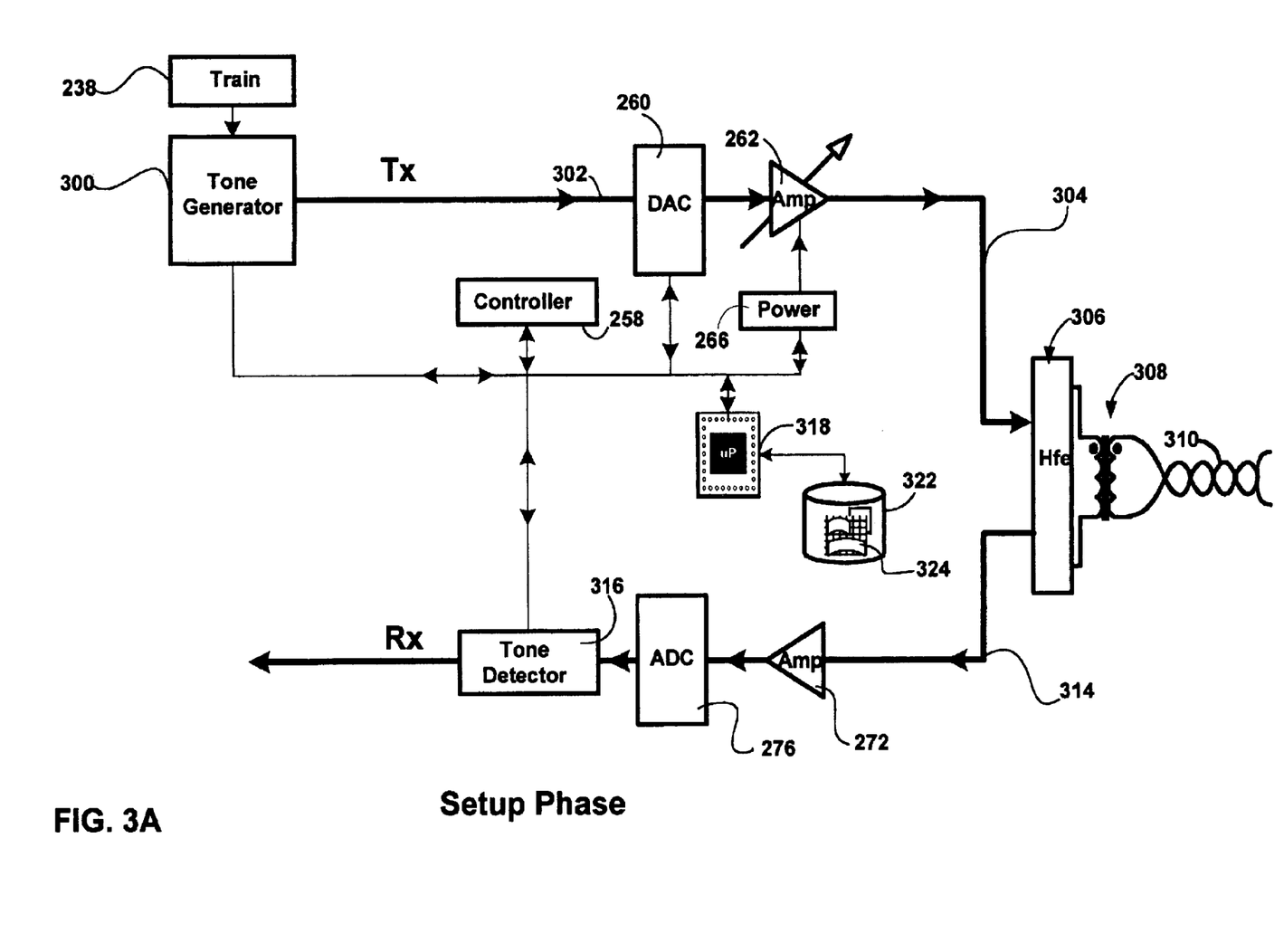
FIGS. 3A–C are detailed logical block diagrams showing basic logic blocks associated with: the setup, configuration and operational phases respectively.
Figure 3B:
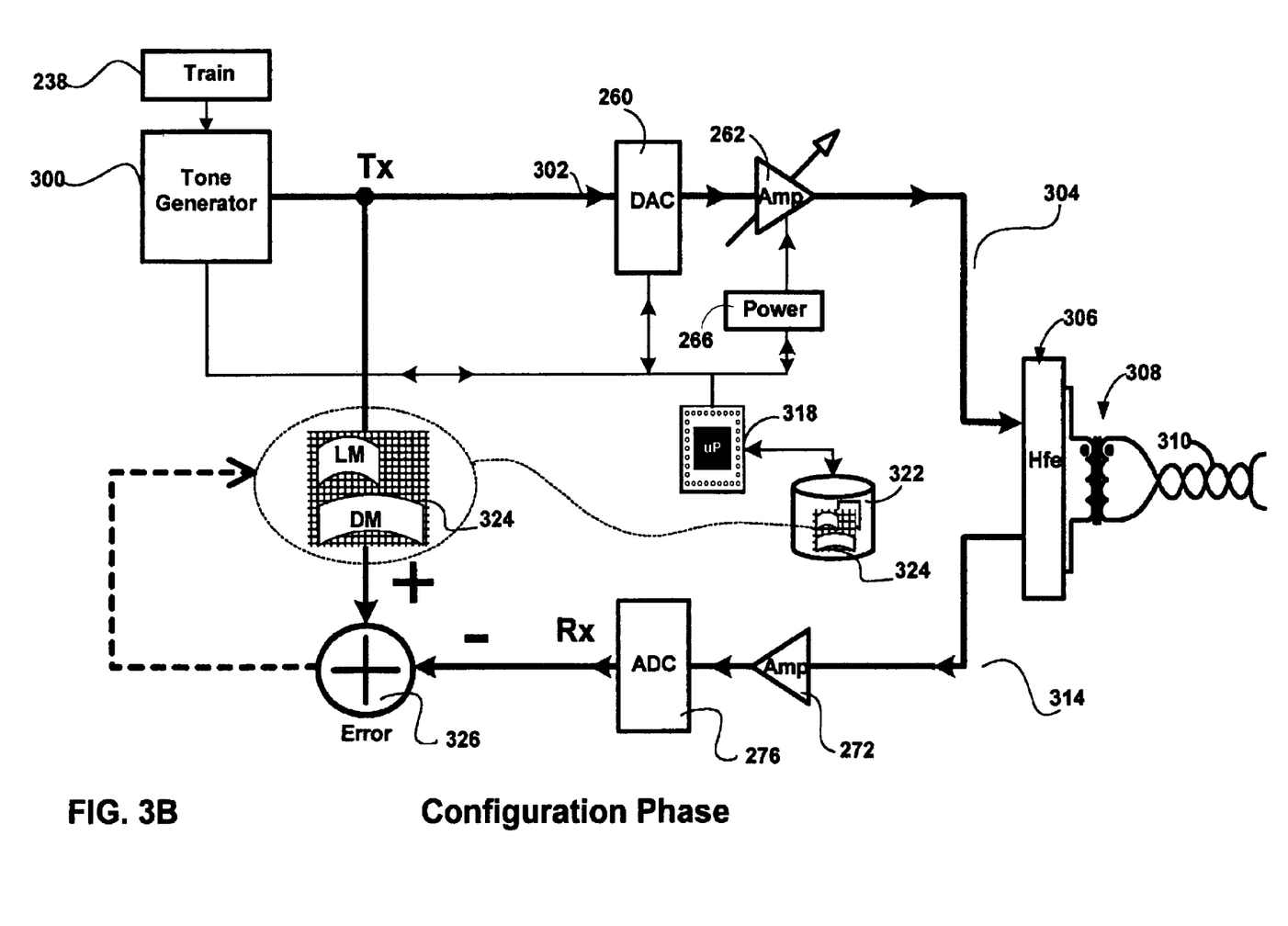
Figure 3C:
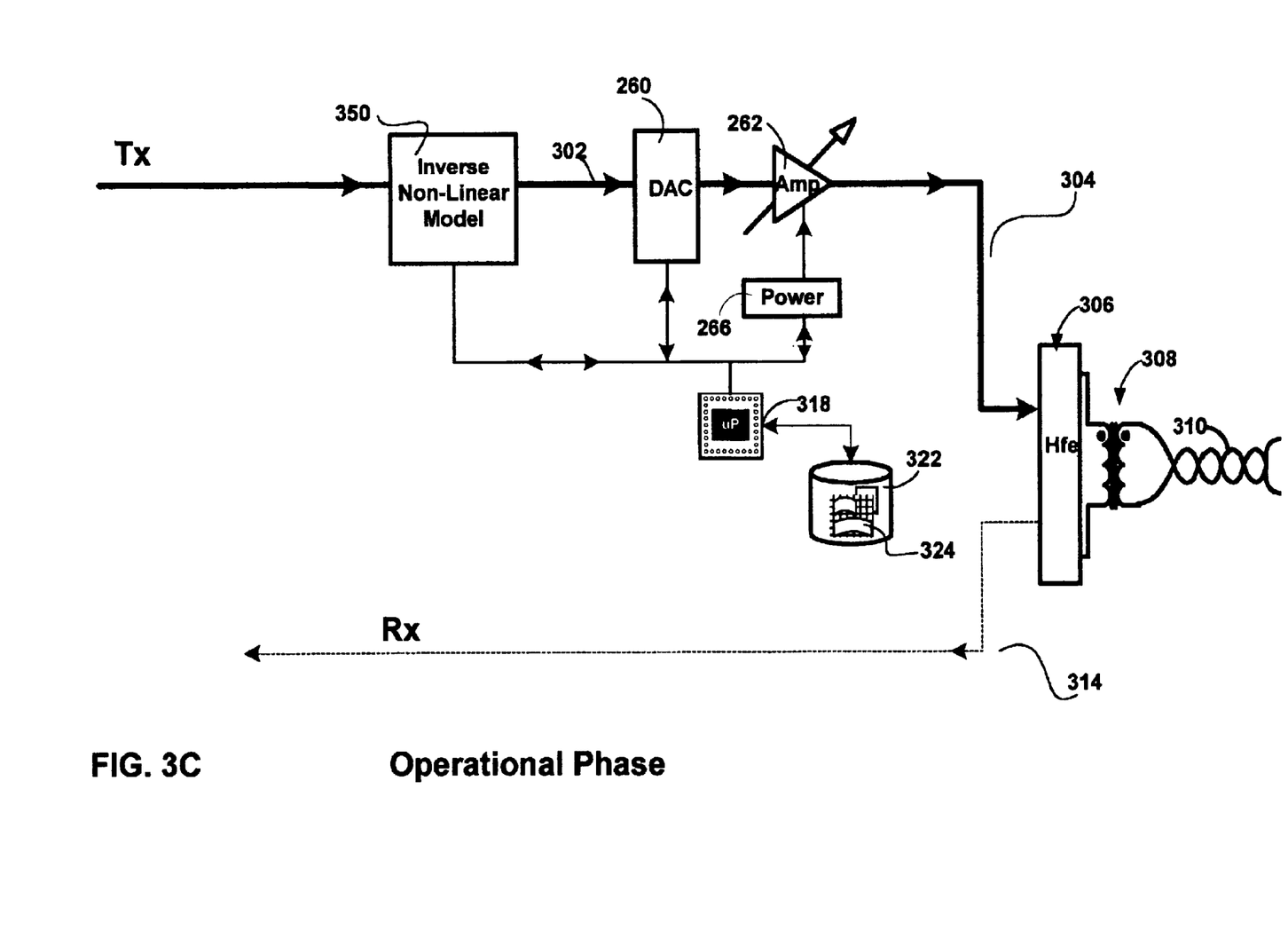

FIGS. 3A–C are detailed logical block diagrams showing basic logic blocks associated with: the setup, configuration and operational phases respectively of the current invention. These blocks may be implemented within the existing processing units of one or more physical or logical modems.

Figure 4A:
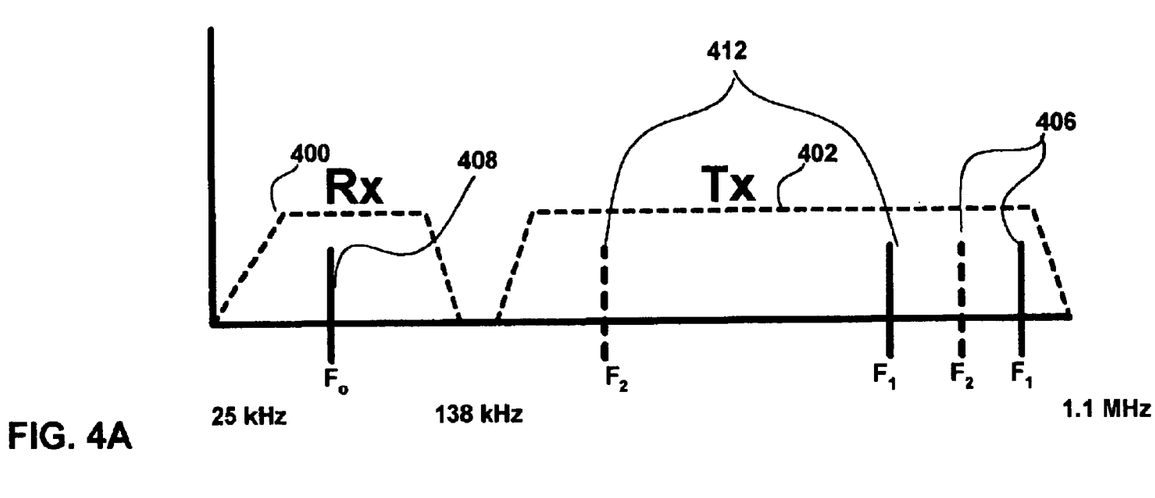
FIG. 4A is a graph of an ADSL signal space showing the asymmetrical upstream and downstream portions thereof.
Figure 4B:
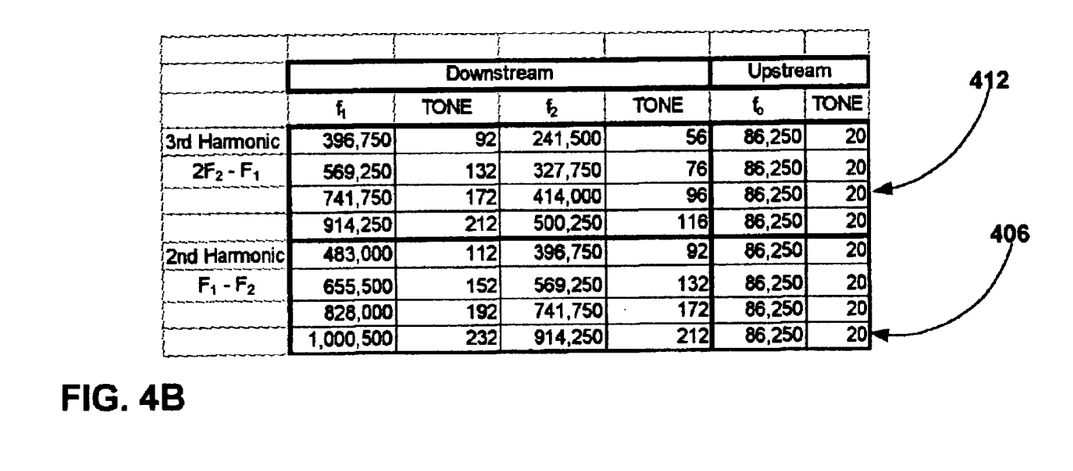
FIG. 4B is a table showing the selected DMT tones for the downstream training sequence which result in a single monitor tone in the upstream channel.

In FIG. 3A a training module 238 is shown coupled to the tone generator 300 which is coupled to the transmit signal path 302. The training module causes the tone generator to generate the tones shown in the following FIG. 4 across the downstream signal space. As each tone is generated over repeated symbol sets the DAC performs the analog conversion and the corresponding amplified signal is generated by amplifier 262 on downstream signal line 304 which couples the transmit path to the hybrid 306. The hybrid is shown coupled to the transformer 308 which in turn is coupled to the subscriber line 310. The current invention nay be applied with equal advantage in wireless media as well. During the generation of each tone the controller 258 effects a change in one or more of the device control parameters of the transmit path modules, e.g. the amplifier 262. The bias, or input voltage from power supply 266 may be varied for example. Alternately parameters such as temperature may be varied. During the generation of each tone, and the variation of the device control parameters a monitor tone is detected in the out-of-band upstream channel 314. This tone is amplified in upstream amplifier 272 and digitized in analog-to-digital converter (ADC) 276 and supplied in digitized form to the tone detector 316. The tone detector may be used to synchronize the controller 258. The tone detector ascertains relevant parameters for the monitor tone such as its amplitude and supplies these to processor 318. This processor stores for each tone and each parameter variation during each tone interval the detected levels of the monitor tone. At the close of this phase of operation the processor 318 determines which among the parameters offers the lowest overall out-of-band leakage across the downstream frequency space. Once this determination has been made the controller locks these control parameters for each of the measured transmit path components, i.e. the amplifier/line driver 262 during subsequent operation.

Next in FIG. 3B the configuration phase of operation is shown with the associated logical and physical components for effecting this phase of operation. In this phase the same tone sequence is generated by the tone generator on the transmit path. The control parameters for the DAC 260 and amplifier are locked, to minimize out-of-band interference. The resultant monitor tone is amplified in amplifier 272 and digitized in ADC 276 and provided as an input to error detector 326. The output of the tone generator is also supplied to processor 318. The processor works with a leakage model table and device model table stored in memory 322 to estimate the level of out-of-band signal for the corresponding tone. The estimated level is compare with the actual level in error detector 326 and the difference is recorded as an offset within the corresponding row of the device parameter table in memory 322. The device parameter table may store relevant functional, mathematical or tabular models for the transmit path components such as the amplifier. For an amplifier the device model would store for example, voltage vs. current curves for the amplifier 262. The leakage model table would model out-of-band monitor tone levels for a variety of in-band-tones. At the conclusion of the configuration phase the device table and the offsets recorded therein are used by processor 318 to generate an inverse channel model.

Next, in FIG. 3C the inverse non-linear channel model 350 stored in memory 322 is used to pre-distort each digitized symbol to linearize the performance of the transmit path. To reduce out of band signal emissions to an acceptable minimum the amplifier input signal is conventionally "pre-distorted" before it is fed into the amplifier. Before the signal is amplified, an estimate is made of the manner in which the amplifier will distort the particular input signal by amplifying that signal. The signal to be amplified is then "pre-distorted" by apply to it a transformation which is estimated to be complementary to the distorting transformation which the amplifier itself will apply to the amplified signal. In theory, the effective pre-distorting transformation is precisely canceled out by the amplifiers distorting transformation, to yield an undistorted, amplified replica of the input signal. Such amplifiers are said to be "linearized" in the sense that the output signal is proportional to the input signal, thereby eliminating the generation of out-of-band components and minimizing in band distortion.

FIG. 4A is a graph of an ADSL signal space showing the asymmetrical upstream and downstream portions thereof. The downstream frequency space 402 is implemented at frequencies between 138 kHz and 1.1 Mhz. The upstream frequency space 400 is implemented between frequencies 138 kHz and 25 kHz. A plurality of dual tone sets 406 and 412 are shown spaced apart within the downstream channel. The transmission of the first of these tone pairs 406 in the downstream frequency space, results in a second order intermodulation in the upstream frequency space at 86,250 Hz. This intermodulation is identified as a monitor signal/tone which as discussed above is used to monitor and set up the pre-distortion system of the current invention. The transmission of the second of these tone pairs 412 in the downstream frequency space, results in a third order intermodulation in the upstream frequency space at the same monitor frequency/tone of 86,250 Hz.

FIG. 4B is a table showing the selected DMT tones for the downstream training sequence which result in a single monitor tone in the upstream channel.

Figure 5:
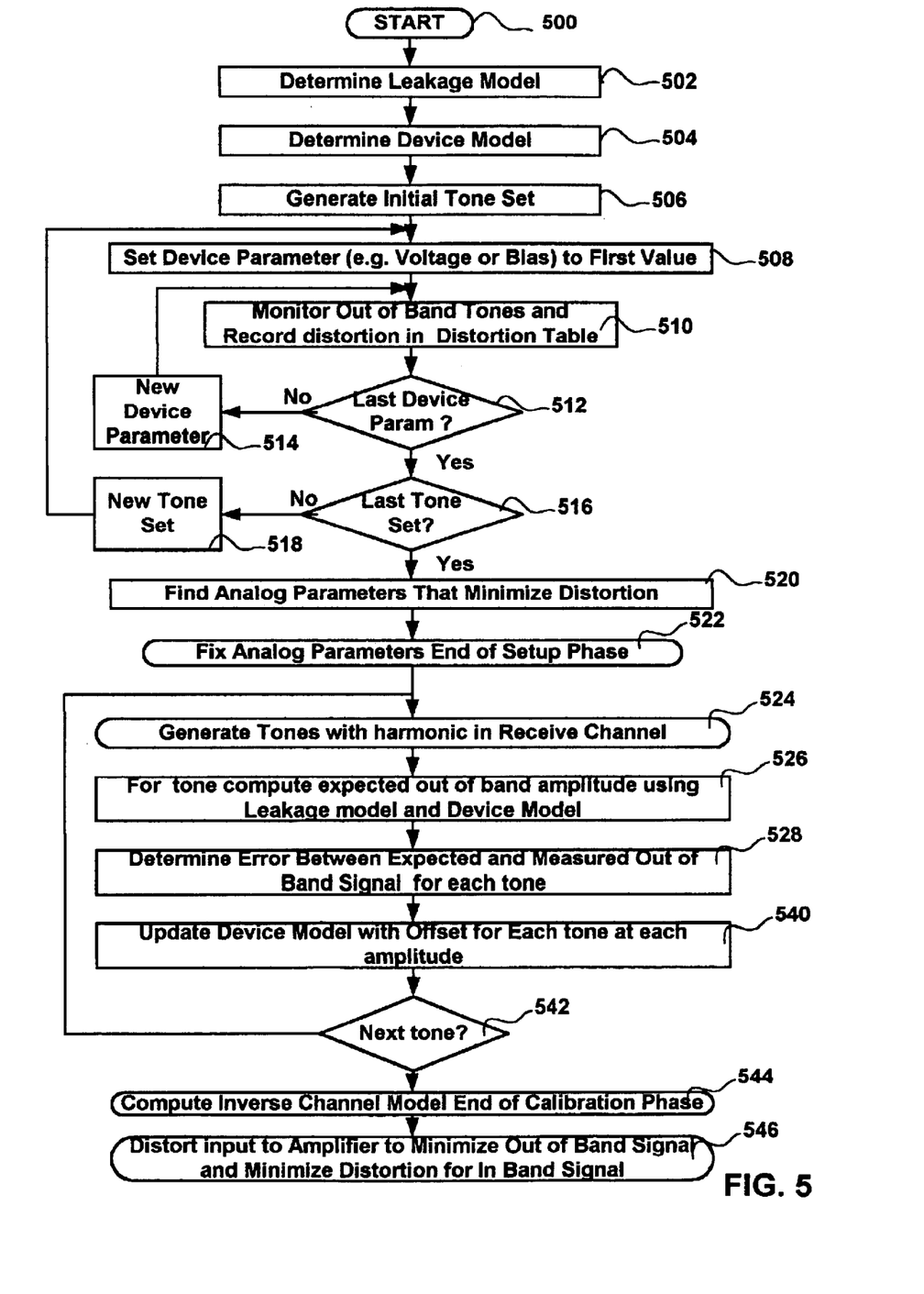
FIG. 5 is a process flow diagram of the setup, configuration and operational phases.

FIG. 5 is a process flow diagram of the setup, configuration and operational phases of the pre-distortion system of the current invention. These processes may be carried out in a single physical modem or in the logical modems discussed above in FIGS. 1–2. Processing begins at start block 500 from which control is passed to processes 502. In process 502 a leakage model which correlates a level of in band tone pairs on the transmit path with the expected level of the corresponding monitor tone on the receive path is uploaded. This may be derived using an electronic simulation package such as Spice or may be empirically or experimentally derived. Next, control passes to process 504 in which the device model for one or more of the transmit path components is also uploaded. The device model for the power amplifier/line driver would be a mathematical model supplied by the manufacturer or empirically or experimentally derived. Then control passes to process 506 in which the initial tone set (Pair) is generated (See FIG. 4B). Next while the first/next tone set is being transmitted variations to device parameters, e.g. voltage or bias are incremented to a first/next value in process 508. Then in process 510 the upstream path is monitored for the out-of-band monitor tone. The level of that tone or the distortion thereof is recorded in a distortion table. Then in decision process 512 a determination is made as to whether the device parameter has been incremented across all possible values during the generation of the selected tone set. If not a new device parameter is selected in process 514 and control returns to process 510 for the monitoring and recording of the relevant parameters of the out-of-band monitor signal generated thereby. Alternately, after all device parameter variations for a selected tone set have been made control passes to decision process 516. In decision process 516 a determination is made as to whether the last tone set of the training sequence has been generated (See FIG. 4B). If not control passes to process 518 for the selection of the next tone set, after which control returns to process 508. Alternately, if the last tone set has been generated during the setup phase then control passes to process 520.

In process 520 the analog parameters that min distortion across a training sequence are determined from the values stored in the distortion table 510. Control then passes to process 522 in which the selected analog control parameters are locked in to the corresponding one(s) of the transmit path components, e.g. the line driver or amplifier. Then control passes to process 524 which is the first of the processes associated with the configuration phase.

In process 524 the training sequence of the plurality of tone sets is again generated, this time producing a monitor signal/tone at reduced levels resulting from the selection processes of the above discussed setup phase. Next in process 526 for each tone set a corresponding estimate of the monitor signal produced thereby is calculated using the leakage model and the device model discussed above. Next in process 528 the estimated level of the monitor signal/tone is compared with the actual level of the monitor signal/tone on the receive path and the error between the two is recorded in the appropriate row of the device model table in process 540. Control then passes to decision process 542 in which a determination is made as to whether the training sequence is complete. If it is control passes to process 544 for the computation of the inverse non-linear channel model from the values stored in the device model table. This marks the end of the calibration phase.

Finally, in process 546 the inverse non-linear channel model is applied during the operational phase to the data transmitted by the modem. This pre-distortion linearizes the output of the transmission path improving tone recovery on the opposing end of the subscriber line, while minimizing out-of-band interference on the receive path.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A multi-tone communication device with a transmit path and a receive path configured to couple to a communication medium and with the transmit path and the receive path including transmit components and receive components respectively, the communication device comprising:
    a training module for transmitting on the transmit path a training sequence comprising pairs of tones transmitted on the transmit path resulting in an intermodulation which generates a single tone corresponding with a monitor signal on the receive path;
    a controller for controlling variations of at least one control parameter of at least a selected one of the transmit components during the transmission of the training sequence by the training module;
    a tone detector on the receive path to detect levels of the monitor signal; and
    a processor which utilizes the detected levels of the monitor signal to determine which among the variations of the at least one control parameter minimizes leakage between the transmit path and the receive path.

2. The communication device of claim 1, the controller further for controlling the locking of the at least one control parameter at the detected levels determined by the processor to minimize leakage during subsequent operation of the communication device.

3. The communication device of claim 1, wherein the controller controls variations of at least one of, a bias voltage, an input voltage and a temperature of a selected amplification component within the transmit path of the communication device.

4. The communication device of claim 1, further comprising on the receive path:
- an analog-to-digital converter (ADC) for digitizing the monitor signal;
- the tone detector coupled to the ADC for detecting an amplitude of the monitor signal; and
- a memory for storage by the processor of the amplitude of the monitor signal and variations of the at least one control parameter corresponding thereto.

5. The communication device of claim 1, wherein the communication medium comprises one of: a wired medium and a wireless medium.

6. The communication device of claim 1, wherein the communication device comprises one of: a physical modem and a logical modem.

7. An X-DSL communication device with a transmit path and a receive path configured to couple to a communication medium and with the transmit path and the receive path including transmit components and receive components respectively, the X-DSL communication device comprising:
- a training module for transmitting on the transmit path a training sequence comprising pairs of tones distributed across a downstream set of X-DSL tones resulting in an intermodulation which generates a single tone corresponding with a monitor signal within an upstream set of X-DSL tones;
- a controller for controlling variations of at least one control parameter of at least a selected one of the transmit components during the transmission of the training sequence by the training module;
- a tone detector on the receive path to detect levels of the monitor signal; and
- a processor which utilizes the detected levels of the monitor signal to determine which among the variations of the at least one control parameter minimizes leakage between the transmit path and the receive path.

8. A communication device with a transmit path and a receive path configured to couple to a communication medium and with the transmit path and the receive path including transmit components and receive components respectively, the communication device comprising:
- a training module for transmitting on the transmit path a training sequence which generates a monitor signal on the receive path;
- a controller for controlling variations of at least one control parameter of at least a selected one of the transmit components during the transmission of the training sequence by the training module;
- a tone detector on the receive path to detect levels of the monitor signal;
- a processor which utilizes the detected levels of the monitor signal to determine which among the variations of the at least one control parameter minimizes leakage between the transmit path and the receive path; and
- an error detector for detecting a difference between an actual level of the monitor signal from an ADC and an estimated level of the monitor signal as estimated by the processor based on a leakage model of the leakage from the transmit path to the receive path together with an initial device model;
- the processor both updating the initial device model to offset the difference and subsequently generating an inverse channel model for predistorting signals on the transmit path to linearize the output of the communication device.

9. The communication device of claim 8, wherein the communication medium comprises one of: a wired medium and a wireless medium.

10. The communication device of claim 8, wherein the communication device comprises one of: a physical modem and a logical modem.

11. A method for operating a multi-tone communication device with a transmit path and a receive path configured to couple to a communication medium and with the transmit path and receive path including transmit components and receive components respectively; the method comprising:
- transmitting on the transmit path a training sequence comprising selected pairs of tones distributed across a downstream set of tones resulting in an intermodulation which generates a single tone corresponding with a monitor signal on the receive path;
- varying a level of at least one control parameter of at least a selected one of the transmit components during said transmitting step;
- monitoring during the varying step the monitor signal on the receive path;
- determining on the basis of the monitoring of the monitor signal the level of the at least one control parameter which minimizes the leakage of the training sequence onto the receive path; and
- utilizing the level of the at least one control parameter determined in said determining step during subsequent transmissions.

12. The method of claim 11, wherein the selected one of the transmit components includes an amplifier and wherein the at least one control parameter varies in said varying step includes at least one of: a bias voltage, an input voltage, and a temperature.

13. The method of claim 11, wherein the monitoring step further comprises the steps of:
- digitizing the monitor signal received on the receive path;
- detecting an amplitude of the monitor signal; and
- storing the amplitude of the monitor signal detected in the detecting step for each variation of the level of the at least one control parameter during said transmitting step the training sequence.

14. The method of claim 11, wherein the communication medium comprises one of: a wired medium and a wireless medium.

15. The method of claim 11, wherein the communication device comprises one of: a physical modem and a logical modem.

16. A method for operating an X-DSL communication device with a transmit path and a receive path configured to couple to a communication medium and with the transmit path and the receive path including transmit components and receive components respectively, the method comprising:
- transmitting on the transmission path a training sequence comprising selected pairs of tones distributed across a downstream set of X-DSL tones an intermodulation of which generates a single tone corresponding with a monitor signal within an upstream set of X-DSL tones;
- varying a level of at least one control parameter of at least a selected one of the transmit components during said transmitting step;
- monitoring during the varying step the monitor signal on the receive path;
- determining on the basis of the monitoring of the monitor signal the level of the at least one control parameter which minimizes the leakage of the training sequence onto the receive path; and utilizing the level of the at least one control parameter determined in said determining step during subsequent transmissions.

17. A method for operating a communication device with a transmit path and a receive path configured to couple to a communication medium and with the transmit path and the receive path including transmit components and receive components respectively, the method comprising:

transmitting on the transmission path a training sequence which generates a monitor signal on the receive path;

varying a level of at least one control parameter of at least a selected one of the transmit components during said transmitting step;

monitoring during the varying step the monitor signal on the receive path;

determining on the basis of the monitoring of the monitor signal the level of the at least one control parameter which minimizes the leakage of the training sequence onto the receive path;

utilizing the level of the at least one control parameter determined in said determining step during subsequent transmissions;

estimating the level of the monitor signal throughout the training sequence using a device model table for the components on the transmit and receive paths;

retransmitting the training sequence;

monitoring during the retransmitting step an actual level of the monitor signal on the receive path;

determining an error between the level of the monitor signal estimated in the estimating step and the actual level monitored in the monitoring step and updating the device model table accordingly;

generating an inverse channel model to linearize an output of the transmit path utilizing the device model table; and predistorting signals transmitted in the transmit path utilizing the inverse channel model generated in the generating step.

18. The method of claim 17, wherein the communication medium comprises one of: a wired medium and a wireless medium.

19. The method of claim 17, wherein the communication device comprises one of: a physical modem and a logical modem.

20. A means for configuring a multi-tone communication device with a transmit path and a receive path configured to couple to a communication medium and with the transmit path and the receive path including transmit components and receive components respectively, the means comprising:

means for transmitting on the transmit path a training sequence which comprises pairs of tones distributed across a downstream set of tones resulting in an intermodulation which generates a single tone corresponding with a monitor signal within an upstream set of tones received on the receive path;

means for varying a level of at least one control parameter of at least a selected one of the transmit components during the training sequence;

means for monitoring in the varying means the monitor signal on the receive path;

means for determining on the basis of the monitoring of the monitor signal the level of the at least one control parameter which minimizes the leakage of training sequence onto the receive path; and means for utilizing the level of the at least one control parameter determined in said determining means during subsequent transmissions.

21. The means for configuring of claim 20, wherein the pairs of tones are distributed across a downstream set of X-DSL tones and the single tone corresponding with the monitor signal is within an upstream set of X-DSL tones received on the receive path.

* * * * *